(12) United States Patent
Fasolino et al.

(10) Patent No.: US 6,860,292 B2
(45) Date of Patent: Mar. 1, 2005

(54) CONTROL SYSTEM FOR AIR-OPERATED DEVICES

(75) Inventors: Gabe Fasolino, Tacoma, WA (US);
Alan K. Forsythe, Kent, WA (US);
John M. Morris, Auburn, WA (US)

(73) Assignee: GT Development, Seattle, WA (US)

( * ) Notice: Subject to any disclaimer, the term of this patent is extended or adjusted under 35 U.S.C. 154(b) by 71 days.

(21) Appl. No.: 10/464,374

(22) Filed: Jun. 17, 2003

(65) Prior Publication Data

US 2004/0256013 A1 Dec. 23, 2004

(51) Int. Cl.$^7$ ............................................. F15B 13/044
(52) U.S. Cl. ................................................. 137/596.16
(58) Field of Search .................................... 137/596.16

(56) References Cited

U.S. PATENT DOCUMENTS 6,789,563 B2 * 9/2004 Filkovski et al. ...... 137/596.16

* cited by examiner

Primary Examiner—Gerald A. Michalsky
(74) Attorney, Agent, or Firm—Delbert J. Barnard

(57) ABSTRACT

A first normally open solenoid valve "A" is connected to passageway (32). A second normally open solenoid valve "B" is connected to a passageway (36). A latching valve (24) includes a valve spool chamber (26) and a valve spool (50) within the chamber. An air-delivery conduit (20) delivers pressurized air to both a first passageway (32) and a second passageway (36). Passageway (32) is connected to one end of the valve spool chamber (26). Passageway (36) is connected to the opposite end of the valve spool chamber (26). The valve spool (50) has two positions. In the first position, passageway (32) is connected with a passageway (40) that extends to an air-operated device (44). Flow through the valve (24) to and from passageway (36) is blocked. In the second position, flow from passageway (32) to passageway (40) is blocked. Also, flow through the valve (24) to and from passageway (36) is blocked. Air in the air-operated device is vented through passageway (40), the path (42), valve spool groove (56) and passageway (46) to a vent avenue (48).

16 Claims, 6 Drawing Sheets

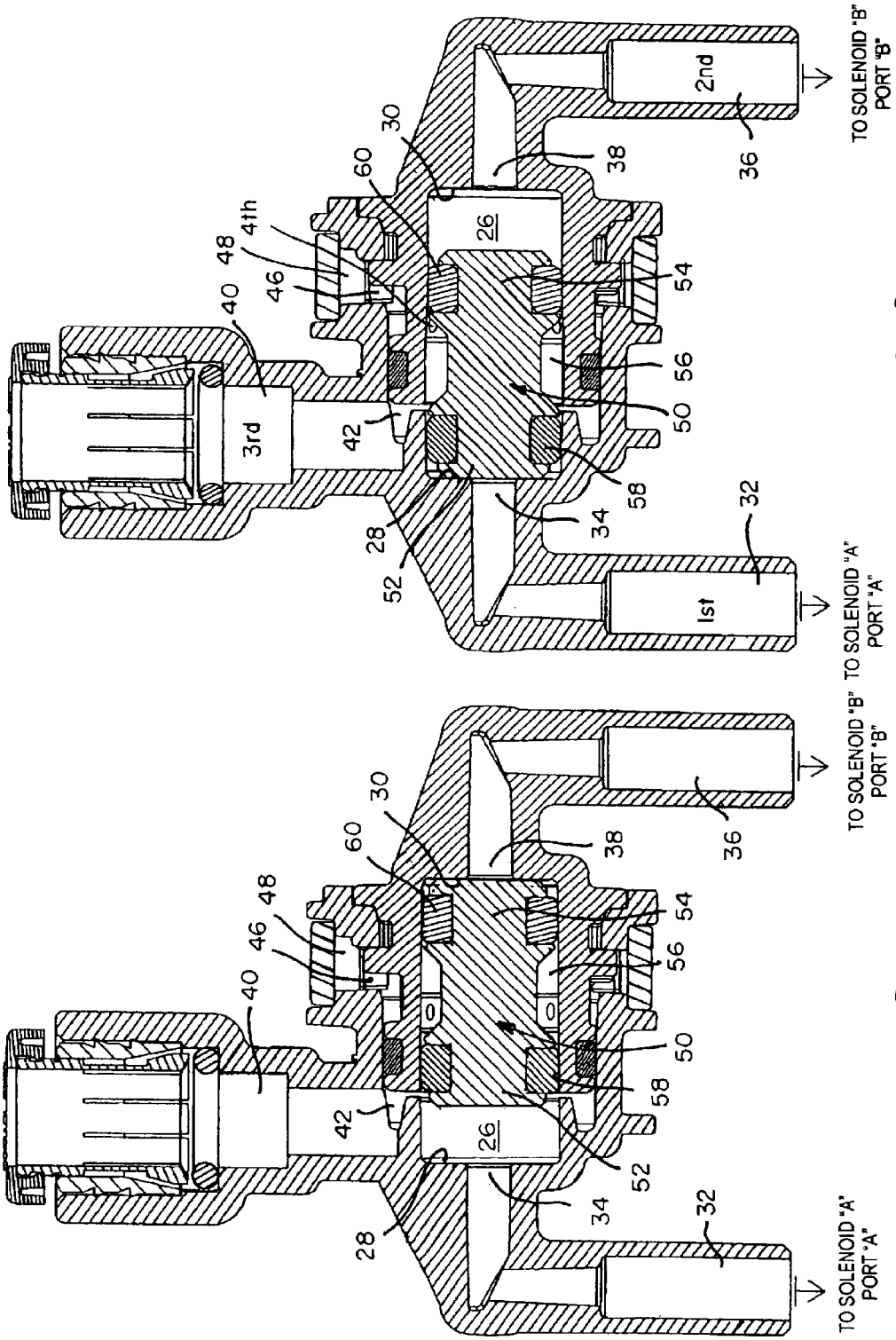

CONTROL SYSTEM FOR AIR-OPERATED DEVICES

TECHNICAL FIELD

This invention relates to control systems for air-operated devices. More particularly, it relates to control systems composed of normally open solenoid valves for controlling air flow to arid from the utilization device and a latching valve adapted to maintain the desired state of the system in the event of a power loss to the solenoid valves.

BACKGROUND OF THE INVENTION

Some control systems for air-operated devices utilize normally open solenoid valves that are turned on and off by electric switches. A problem with these systems is that a loss of power to the solenoid valves, for any reason, may cause an undesirable change in the state of the air in the system. For example, some trucks are provided with an air-operated suspension system. The driver of the truck may wish to park the truck at a loading dock, dump the air in the suspension system, and at the same time turn off the ignition and leave the truck in this state for a long period of time. In the conventional air/electric system, turning off the ignition would cause the solenoid valve that dumps the air to become de-energized, causing the suspension system to return to a suspended position. It is not a viable option to leave the solenoid energized indefinitely because this would result in an undesirable drain of the battery in the truck. There is a need to overcome the stated problem by providing an air signal that does not change state when electric power is lost or removed. The primary object of this invention is to fill this need.

BRIEF SUMMARY OF THE INVENTION

The control system of the present invention is basically characterized by first and second, normally open solenoid valves, each having a first port, a second port and a vent port. Each valve has an open position in which the first port is connected to the second port and the vent port is closed, Each valve has a closed position in which the first port is closed and the second port is connected to the vent port which is open. The source of pressurized air is connected to both the first port of the first solenoid valve and the first port of the second solenoid valve. The system includes a latching valve comprising a valve spool chamber having first and second ends and a first passageway having a first end connected to the second port of the first solenoid valve and a second end connected to the first end of the valve spool chamber. It also includes a second passageway having a first end connected to the second port of the second solenoid valve and a second end connected to the second end of the valve spool chamber. A third passageway leads from the valve spool chamber, at a location between its ends, to the air-operated utilization device. A fourth passageway leads from the valve spool chamber, at another location between its ends, to exhaust. There is a valve spool within the valve spool chamber that has first and second lands and a girth groove between the lands. The valve spool has a second position in which it is proximal the first end of the valve spool chamber and distal the second end of the valve spool chamber. In this position, the valve spool groove connects the third passageway with the fourth passageway and flow between the first and third, passageways is blocked by the valve spool. The valve spool has a first position in which it is distal the first end of the valve spool chamber and proximal the second end of the valve spool chamber. In this position, the girth groove connects the first passageway to the third passageway. Flow from the second passageway through the valve is always blocked by the valve spool.

In preferred form, the valve spool chamber has a substantially cylindrical sidewall and each land includes a seal ring that contacts the sidewall. Also, in preferred form, the latching valve comprises a first housing part that includes the first and third passageways and a portion of the valve spool chamber and a second housing part that includes the second and fourth passageways and the remainder of the valve spool chamber. The first and second housing parts are connected together. The first housing part may include a cylindrical chamber and the second housing part may include a cylindrical nipple that fits within the cylindrical chamber of the first housing part. A seal ring may be provided between the nipple and the sidewall of the chamber in which the nipple is received.

The first solenoid valve may be in the first housing and the second solenoid valve may be in the second housing. The first and second housings may be positioned adjacent each other. The first part of the latching valve housing may be attached to the first solenoid housing and the second part of the latching valve housing may be connected to the second solenoid valve housing.

In preferred form, the cylindrical chamber of the first housing part has a sidewall including an axial groove. The cylindrical nipple of the second housing part includes a lock lug sized to fit into the axial groove. The lock lug and groove form a bayonet connection. The first housing part may include a lock lug receiving radial opening positioned in its sidewall at a location circumferentially from the axial slot. The second housing part is rotatable in position when the cylindrical nipple is within the cylindrical chamber, for moving the lock lug out from the axial slot and into the lock lug receiving opening. The seal ring that is between the nipple and the sidewall of the cylindrical member is positioned in the cylindrical chamber axially inwardly of the lock lug receiving opening in the sidewall of the cylindrical chamber.

Preferably, the first and second housing parts are each molded from a structural plastic.

Other objects, advantages and features of the invention will become appartent from the description of the best modes set forth below, from the drawings, from the claims and from the principles that are embodied in the specific structures that are illustrated and described.

BRIEF DESCRIPTION OF THE SEVERAL VIEWS OF THE DRAWING

Like reference numerals are used to designate like parts throughout the several views of the drawing, and:

FIG. 3 is a longitudinal sectional view taken through a preferred embodiment of the latching valve, such view showing a valve spool in a first position within a valve chamber, such view also showing the passageway rotated in position from its true position, shown in FIGS. 2, 6 and 7;

FIG. 4 is a view like FIG. 3, but showing the valve spool in a second position in the valve spool chamber;

DETAILED DESCRIPTION OF THE INVENTION

Figure 1:
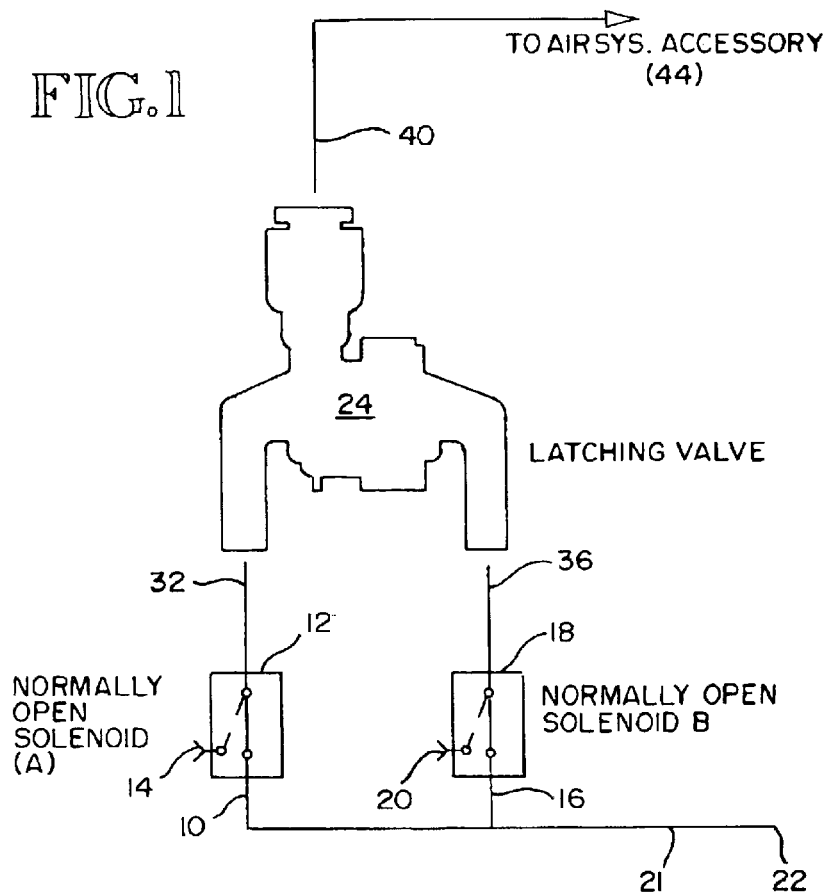
FIG. 1 is a schematic diagram of a system for controlling the delivery of air from an air source to an air system operated accessory.

FIG. 1 is a schematic view of one embodiment of the invention. It shows a pair of normally open solenoid valves "A" and "B". The first solenoid valve, valve "A", has a first port 10, a second port 12 and a vent port 14. The second solenoid valve, valve "B", has a first port 16, a second port 18 and a vent port 20. When valve "A" is open, port 10 is connected to port 12. When valve "B" is open, port 16 is connected to port 18. When valve "A" is closed, port 12 is connected to the vent port 14. In similar fashion, when valve "B" is closed, port 18 is connected to vent port 20. An air delivery line 21 delivers pressurized air to both the first port 10 of valve "A" and first port 16 of valve "B". Air delivery line 21 comes from a source of pressurized air 22, e.g., an air compressor.

The system of the invention also comprises a latching valve 24 that includes a spool chamber 26 (FIGS. 3 and 4) having first and second ends 28, 30. A first passageway 32 is connected at a first end to the second port 12 of the first solenoid valve "A" and at a second end 34 to the first end of the valve spool chamber 26. A second passageway 36 is connected at a first end to the second port 18 of the solenoid valve "B" and at a second end 38 to the second end 30 of the valve spool chamber 26. A third passageway 40 leads from the valve spool chamber, at a location 42 (FIGS. 2–5) between its ends 28, 30, to an air-operated utilization device 44. A fourth passageway 46 leads from the valve spool chamber 26, at another location between its ends, to a dump path 48. The latching valve 24 includes a valve spool 50 within the valve spool chamber 26. Valve spool 50 has first and second lands 52, 54 and a passageway groove 56 between the lands 52, 54. Valve spool 50 has a first position, shown in FIG. 3, in which it is proximal the second end 30 of the valve spool chamber 26 and distal the first end 28 of the valve spool chamber 26. In this position, the valve spool groove 56 is nonfunctional. Valve spool 50 has a second position, shown in FIG. 4, in which it is proximal the first end 28 of the valve spool chamber 26 and distal the second end 30 of the valve spool chamber 26 (FIG. 4). When valve spool 50 is in this position, the third passageway 40 is connected to the fourth passageway 46 via path 42 and groove 56. As shown by FIGS. 3 and 4, the valve spool lands 52, 54 have peripheral girth grooves in which seal rings 58, 60 are situated. The outer peripheries of the seal rings 58, 60 contact a cylindrical sidewall of the valve spool chamber 26, as will herein after be described in more detail.

As previously stated, when the valve spool 50 is in the position shown by FIG. 3, passageway 32 is connected with passageway 40. When the valve spool 50 is in the position shown by FIG. 4, air flow between passageway 32 and passageway 40 is blocked and passageway 40 is connected to passageway 46 and port 48 via path 42 and groove 56. Flow through the valve to and from passageway 36 is always blocked by the valve spool 50, regardless of the position that it is in. Thus, when the valve spool 50 is in the position shown by FIG. 3, and air pressure is in passageway 32, the air pressure is connected with the air-operated device 44 via path 42, passageway 40, valve plug chamber 20 and passageway 40. When the valve spool 50 is in the position shown by FIG. 4, air pressure delivery to passageway 40 is stopped and the air-operated device 44 and the passageway 40 are vented (or "dumped") through path 42, groove 56, passageway 46 and port 48.

Figure 5:
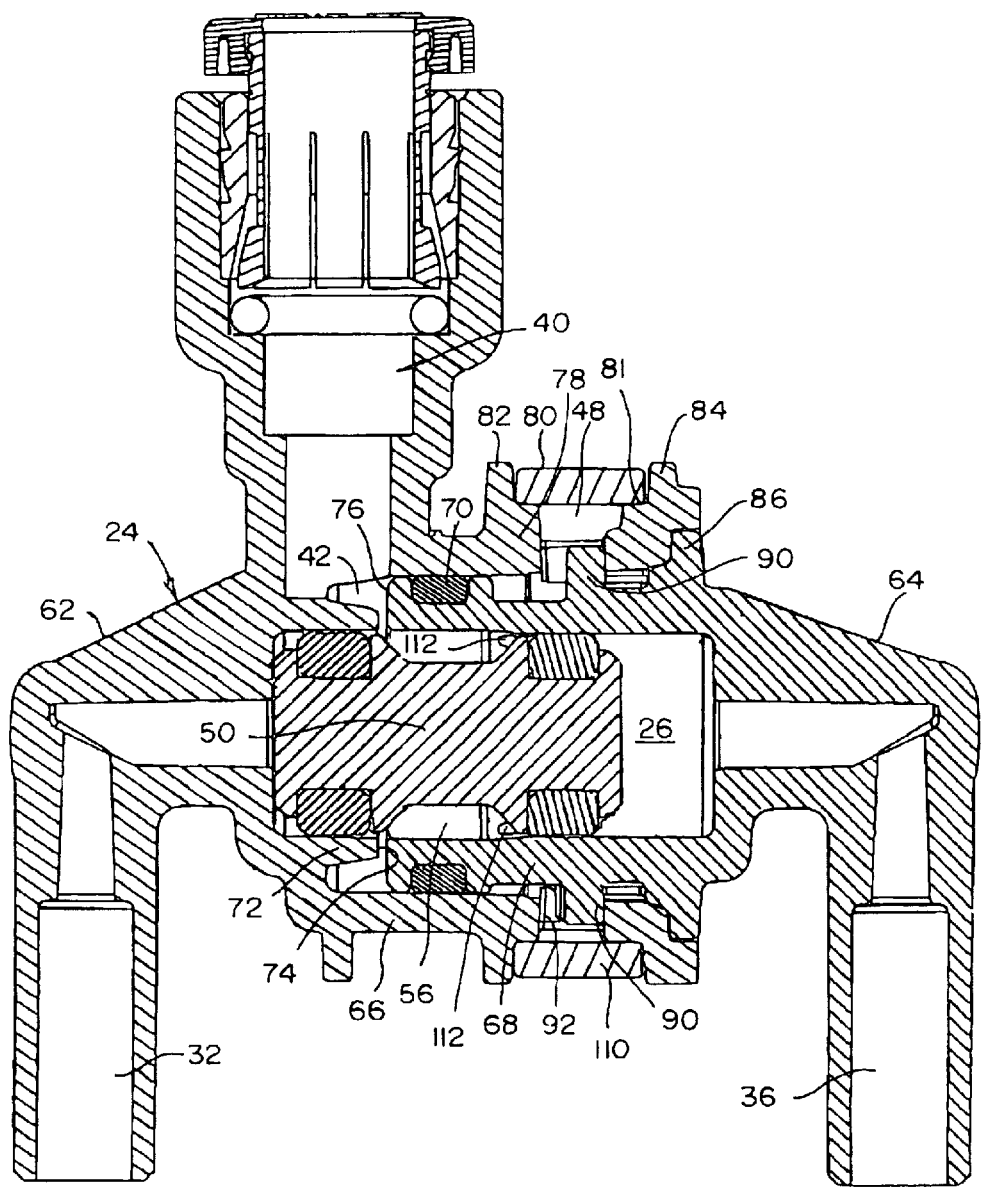
FIG. 5 is an enlarged scale view of FIG. 4, showing the construction of the latching valve housing.

Referring to FIG. 5, the illustrated embodiment of the latching valve 24 has two housing parts 62, 64 which when united form a housing for the latching valve 24. The first housing part 62 includes passageway 32, path 42, passageway 46 and a portion of valve plug chamber 26. The second housing part 64 includes passageway 36 and the remaining portion of valve plug chamber 26. Housing part 62 includes a tubular portion 66 having a cylindrical interior. Housing part 64 includes a tubular nipple 68 sized to fit snugly within the opening in tubular portion 68. Nipple 68 includes a radially outwardly opening girth groove in which a seal ring 70 is received. When the nipple 68 is within the tubular portion 66, the seal ring 70 is in sealing engagement with the cylindrical inner surface of the tubular portion 66. Also, the portion of the valve spool chamber 26 that is in housing part 62 is in axial alignment with the portion of valve spool chamber 26 that is within housing part 64. When the valve spool 50 is in the position shown by FIG. 3, it is completely within the portion of the valve plug housing that is within housing part 64. When the valve spool 50 is in the position shown by FIG. 4, its land 52 and the seal ring 58 are within the portion of valve plug housing 26 that is in housing part 62.

Housing part 62 also includes a cylindrical lip 72 having an end edge 74. Nipple 68 includes an end edge 76 which confronts the end edge 74. A gap is formed between edges 74, 76. This gap forms the fluid passageway 42 between the valve spool chamber 26 and passageway 46. When the valve spool 50 is in the position shown by FIG. 3, valve spool chamber 26 is connected to passageway 40 via this gap 42. When valve spool 50 is in the position shown by FIG. 4, passageway 46 is connected to the passageway groove 56 via this gap 42.

A feature of the invention is that the ends of the valve spool 50 are equal in area. As a result, it both ends of the valve 50 are connected to the same pressure, there will be no movement of the valve spool 50. That is, if the pressure in passageway 32 equals the pressure in passageway 36, the valve spool 50 will not move. If the pressure in passageway 32 is larger than the pressure in passageway 36 by a certain minimum amount, however, the valve spool 50 will be moved into the position shown by FIG. 3. And if the pressure in passageway 36 is larger than the pressure in passageway 40 by a certain minimum amount, the valve spool 50 will be moved into the position shown by FIG. 4.

Figure 2:
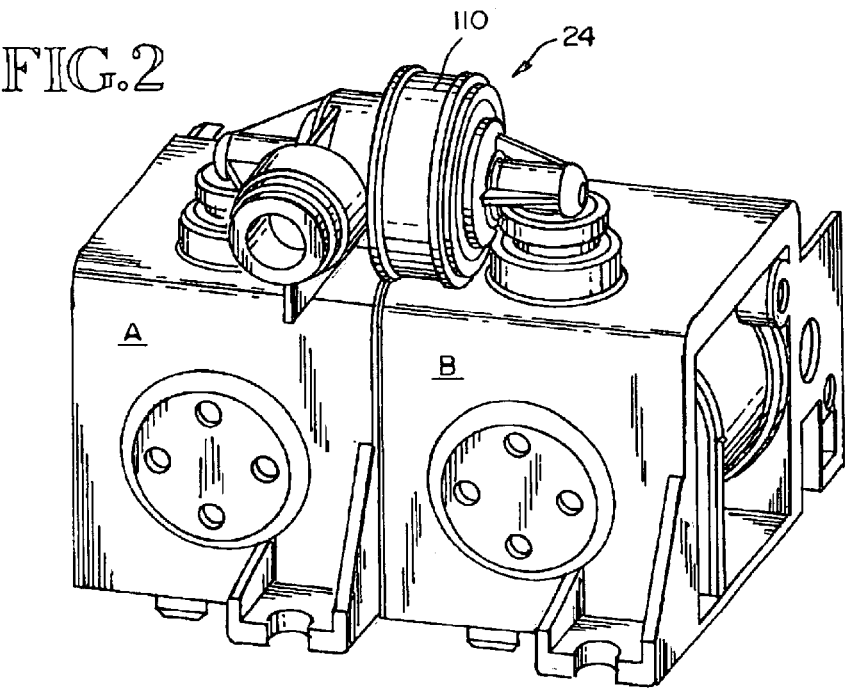
FIG. 2 is a pictorial view of two solenoid valves and a latching valve mounted on top of the two solenoid valves, such view being taken from above and looking towards one side, the top and one end of the assembly.

As shown by FIG. 2, the solenoid valves "A" and "B" have separate housings or casings that are adapted to be assembled together. The latching valve 24 is mounted on top of the assembly. Housing part 62 is shown to be connected to the housing for solenoid valve "A" and the housing part 64 is shown to be connected to the housing for the solenoid valve "B".

Figure 6:
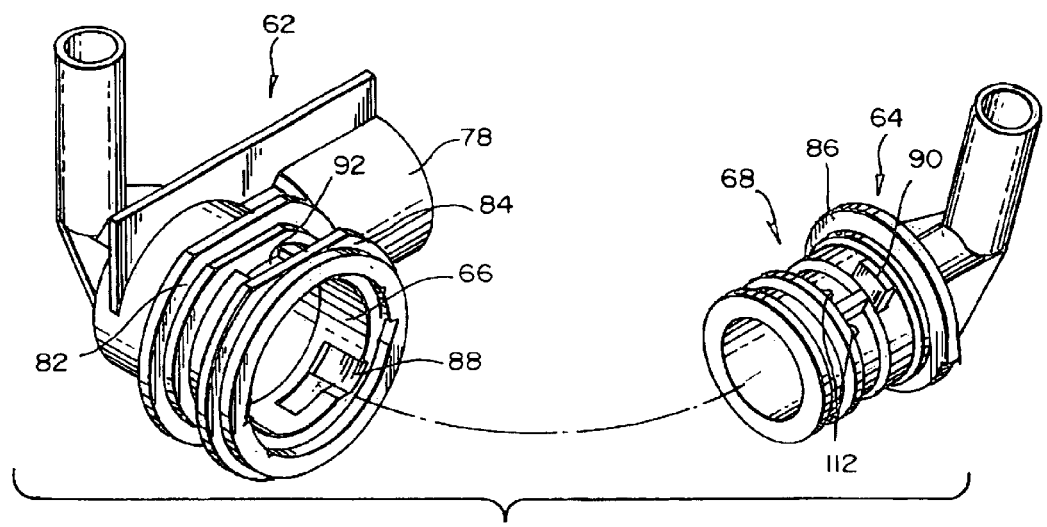
FIG. 6 is an exploded pictorial view of the first and second housing parts of the preferred embodiment of the latching valve, such view showing that the first housing part includes a cylindrical chamber and the second housing part includes a cylindrical nipple that is insertable into the cylindrical chamber, such view showing the two housing parts aligned along an arcuate line so as to show the inner end of the nipple.
Figure 7:
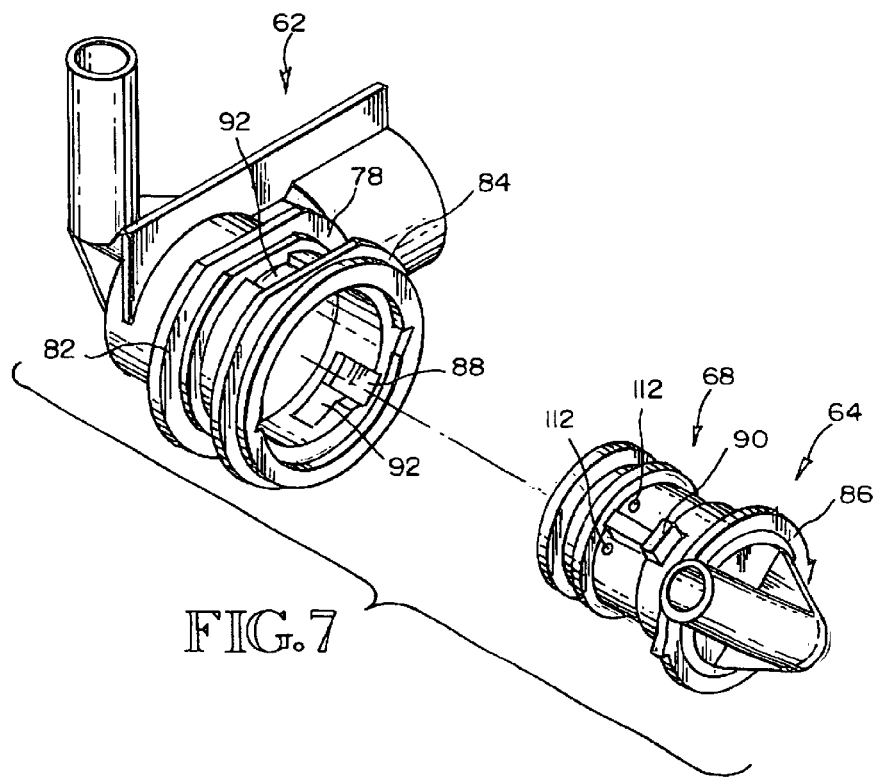
FIG. 7 is another exploded pictorial view of the two housing parts, but showing the two housing parts aligned axially along a straight line.
Figure 8:
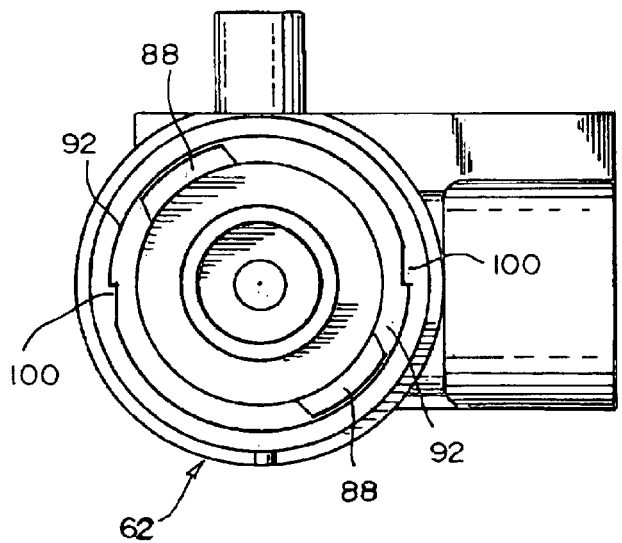
FIG. 8 is an end view of the first housing part, looking into the open end of the cylindrical chamber in this housing part.
Figure 9:
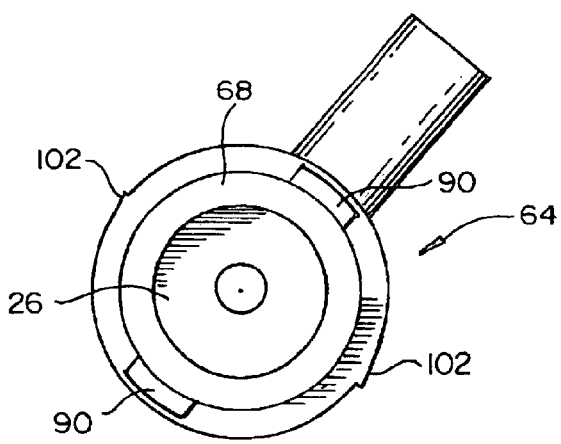
FIG. 9 is an end view of the second housing part, looking towards the inner end of the nipple.
Figure 10:
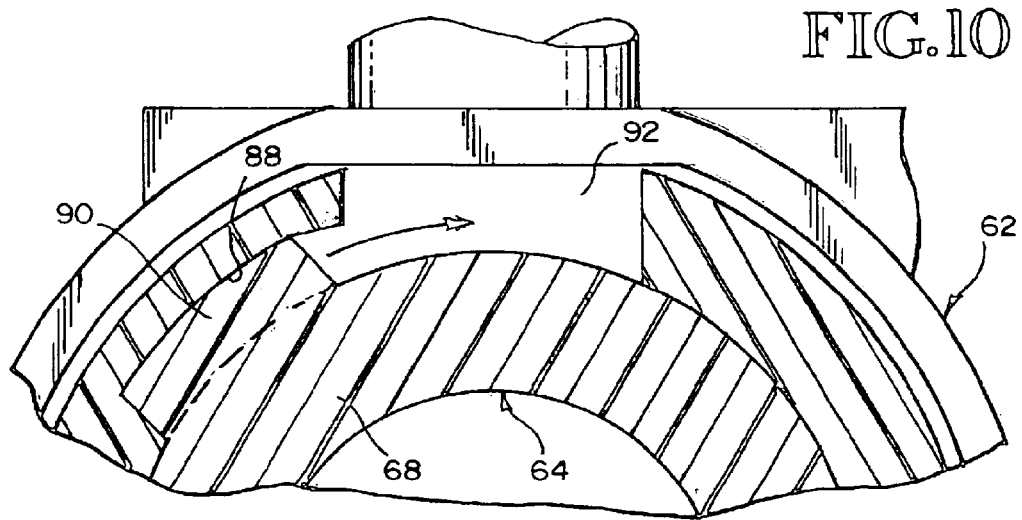
FIG. 10 is an enlarged scale fragmentary sectional view showing the nipple within the cylindrical chamber and showing a lock lug on the nipple within an axial slot in the sidewall of the cylindrical chamber, such view including an arrow indicating a direction that the cylindrical nipple can be rotated relative to the cylindrical chamber.
Figure 11:
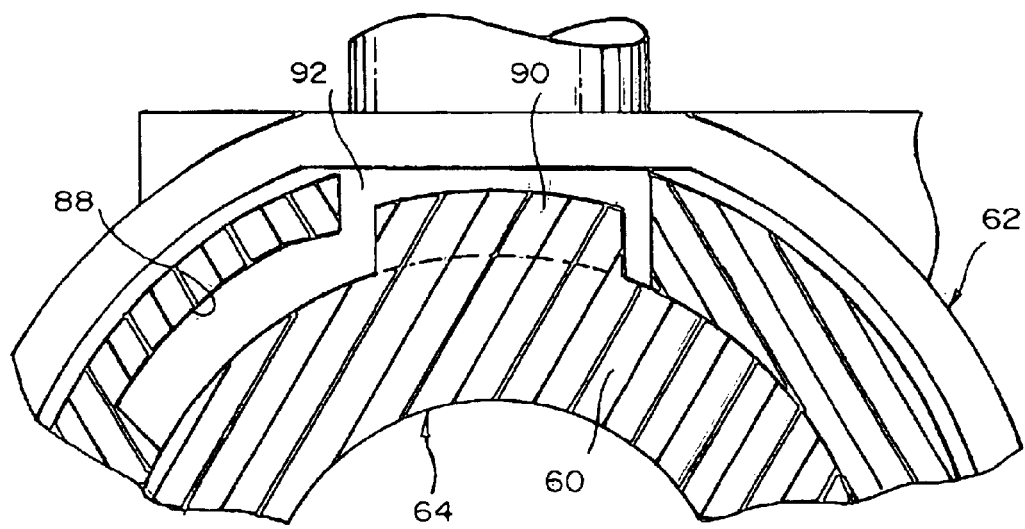
FIG. 11 is a view substantially like FIG. 10 but showing the cylindrical nipple rotated in position to move the lock lug out from the axial slot and into a lock lug receiving radial opening in a sidewall portion of the cylindrical chamber.

As best shown by FIGS. 6 and 7, housing part 62 has an inner end portion 78 that includes a first radial flange 82 and a second radial flange 84. Flanges 82, 84 are formed on a tubular portion 66 which provides an outer sidewall for the chamber in which the nipple 68 is received. Nipple 68 includes a radial flange 86. In preferred form, sidewall 66 includes a pair of diametrically opposite axial slots 88 inside the cylindrical chamber. Nipple 68 includes a pair of diametrically opposite, radially extending lock lugs 90. FIGS. 3–5 show both lugs 90. FIGS. 6 and 7 show one of the lugs 90 and one of the axial grooves 88. The lug 90 that is shown fits into an axial groove 88 that is not shown but is diametrically opposite the axial groove 88 that is shown. The second lock lug 90 that is no shown in FIGS. 6 and 7 fits into the axial groove 88 that is shown in FIGS. 6 and 7. FIG. 8 shows both of the axial slots 88. FIG. 9 shows both of the lock lugs 90. FIG. 10 shows one of the lock lugs 90 within one of the axial slots 88. FIG. 11 shows the same lug 90 rotated in position out from the axial slot 88 into the lock lug receiving opening 92.

The sidewall 66 also includes a pair of radial, diametrically opposite lock lug receiving lock openings 92. Lock openings 92 are positioned circumferentially adjacent the inner ends of the axial slot 88. The two housing parts 62, 64 are connected together in the following manner. The lock tugs 90 are axially aligned with the axial slot 88. Then, part 64 is moved axially into the inner chamber in part 62 until the lock lugs 90 are at the inner ends of the axial slot 88. Then, the housing part 64 is rotated in position relative to housing part 62, for moving the lock lugs 90 circumferentially from the axial slot 88 into the lock lug receiving openings 92. The housing parts 62, 64 are sufficiently resilient to allow movement the locking lugs 90 back and forth between the axial slot 88 and the lock lug receiving openings 92.

When the parts 62, 64 are in the position shown by FIG. 11, the engagement of the lock lugs 90 in the lock lug receiving openings 90 will hold the two housing parts 62, 64 secured together. However, the material from which the housing parts 62, 64 are constructed, and the dimensions of the parts allow part 64 to be rotated in position relative to the part 62 for moving the lock lugs 90 out from the lock lug receiving opening 92 and back into the axial slot 88.

Figure 12:
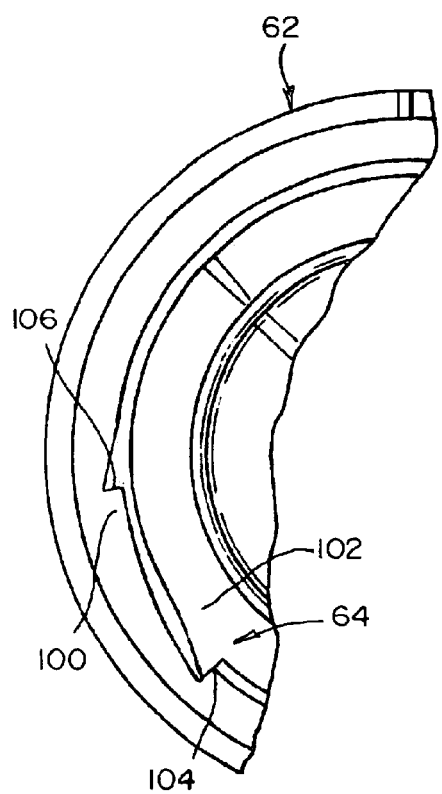
FIG. 12 is an enlarged scale fragmentary sectional view showing a catch on the first valve housing part and a complementary catch on the second valve housing part.
Figure 13:
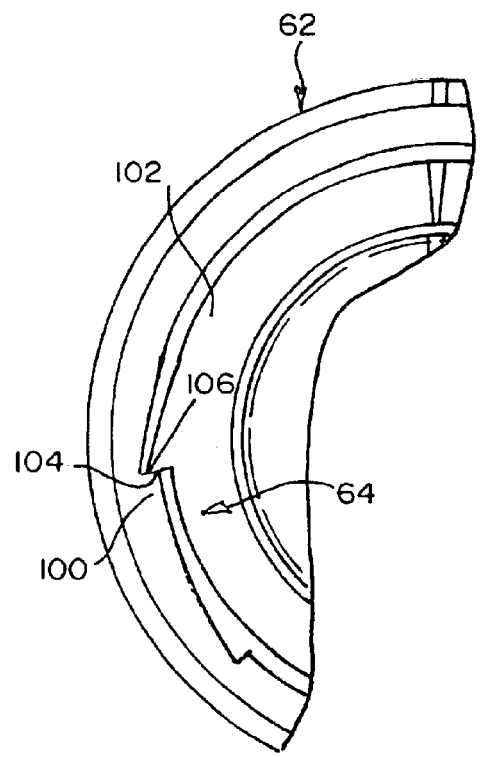
FIG. 13 is a view like FIG. 12 but showing a second rotational position of the first valve housing part with the second valve housing part.

As shown by FIG. 8, the inner chamber in housing part 62 may include one or two catches 100. As shown by FIG. 9, housing part 64 may also include one or two catches 102. FIG. 12 shows the relationship of each catch 102 to the corresponding catch 100 when the nipple 68 is within the cylindrical chamber and the lock lugs 90 are within the axial grooves 88. When the part 64 is rotated relative to the part 62, for moving the lock lugs 90 out from the axial grooves 88 and into the radial lock lug receiving openings 92, the sloping, leading part of catch 102 travels along the sloping part of catch 100 until the substantially radial surface 104 is contiguous the substantially radial surface 106. See FIG. 13. Easy rotation of part 62 relative to part 64 opposite in the direction of the arrow will be resisted by a contact between the radial surfaces 104, 106. However, the parts 62, 64 are resilient enough that surface 104 will be caused to move from a position confronting surface 106 back towards the position shown by FIG. 12. When the surface 104 confront the surfaces 106, there is a sufficient amount of locking together of the two parts 62, 64 to keep them from rotating out of position.

The parts 62, 64 are preferably injection-molded from a suitable structural plastic material. A plastic material is chosen that is sufficiently tough and strong to withstand the forces that are imposed on the parts 62, 64 and yet is substantially resilient enough to allow the above-described movement of the catches 100, 102 into and out from a locked or latched position that has been described.

The operation of the system will now be described. Let it be assumed that the latching valve is in the position shown by FIG. 3. The solenoid valve "A" is in its normally open position while electrical energy is delivered to solenoid valve "B" to move the valve into a closed position in which it blocks air pressure from conduit 20 to passageway 36, via solenoid valve "B", and connects passageway 36 with the vent in solenoid valve "B". As a result, there is no pressure acting on the right end of the valve spool 50. Pressurized air is delivered from conduit 22 through solenoid valve "A" into passageway 40 and against the left side of the valve spool 50. The pressure differential moves the valve spool 50 into the position shown by FIG. 3. The pressurized air then flows from passageway 40, through path 42, and through passageway 46 to the air-operated device 44. Now let it be assumed that it is desired to disable the air-operated device 44. This is done by energizing solenoid valve "A", causing it to close, while removing electrical energy from solenoid valve "B", allowing it to return to its normally open position. The closing of solenoid valve "A" connects the passageway 40 to the vent port 14 of solenoid "A", allowing the pressure at the left end of the valve spool 50 to drop. The opening of solenoid valve "B" connects the pressurized air in conduit 20 with passageway 36 and the right end of the valve spool 50, creating a pressure differential that shifts the valve spool 50 from the position shown by FIG. 3 into the position shown by FIG. 4. When the valve spool 50 is in the positions shown by FIG. 4, the pressurized air in passageway 46 is vented through path 42 into the groove 56 and from groove 56 through passageway 46 and on to the vent avenue 48. The vent avenue 48 is normally closed by a resilient band 110 which spans across an axial gap defined by and between flanges 82, 84 (FIG. 5). When the air pressure is venting, and flows from passageway 40 through gap 42, through groove 56 and through sidewall openings 112 in the nipple 68, this venting air enters chamber 48 under pressure and stretches the resilient band 110, moving it off from its seat 80, 81 and creating spaces through which the air can vent to the atmosphere. The pressure in the air-operated device is released and that device changes. At this time, the operator may turn the power off to solenoid valve "A", allowing it to open and allowing pressurized air in conduit 20 to flow back into passageway 40 and against the left end of the valve spool 50. However, at this time, the solenoid valve "B" is still open and so the same pressure is being delivered against the right end of the valve spool 50. Because the pressure is the same at both ends of the valve spool 50 and because the area is the same at both ends of the valve spool 50, the valve spool 50 will not shift back to the position shown in FIG. 3.

The illustrated embodiment is only an example of the present invention and, therefore, is non-limitive. It is to be understood that many changes in the particular structure, materials and features of the invention may be made without departing from the spirit and scope of the invention. Therefore, it is my intention that my patent rights not be limited by the particular embodiment that is illustrated and described herein, but rather is to be determined by the following claims, interpreted according to accepted doctrines of patent claim interpretation, including use of the doctrine of equivalents.

What is claimed is:

1. A control system for an air-operated utilization device, comprising:

a first, normally open solenoid valve having a first port, a second port, a vent port, an open position in which the first port is connected to the second port and the vent port is closed, and a closed position in which the vent port is open;

a second, normally open solenoid valve having a first port, a second port, a vent port, an open position in which the first port is connected to the second port and the vent port is closed, and a closed position in which the vent port is open;

a source of pressurized air connected to both the first port of the first solenoid valve and the first port of the second solenoid valve; and a latching valve comprising a valve spool chamber having first and second ends, a first passageway having a first end connected to the second port of the first solenoid valve and a second end connected to the first end of the valve spool chamber; a second passageway having a first end connected to the second port of the second solenoid valve and a second end connected to the second end of the valve spool chamber; a third passageway leading from the valve spool chamber at a location between its ends to the air-operated utilization device; a fourth passageway leading from the valve spool chamber at another location between its ends to exhaust; and a valve spool within said valve spool chamber, said valve spool having first and second lands and a passageway groove between the lands, said valve spool having a first position in which it is adjacent the first end of the valve spool chamber, and away from the second end of the valve spool chamber and the valve spool groove connects the third passageway with the fourth passageway, and flow between the first and third passageways is blocked by the valve spool member, and a second position in which the valve spool is away from the first end of the valve spool chamber and adjacent the second end of the valve spool chamber and the valve spool groove connects the first passageway to the third passageway and flow between the second and third passageways is blocked by the valve spool member.

2. The control system of claim 1, wherein the valve spool chamber has a substantially cylindrical sidewall and each land includes a seal ring that contacts the sidewall.

3. The control system of claim 1, wherein the latching valve comprises a first housing part that includes the first and third passageways and a portion of the valve spool chamber and a second housing part that includes the second and fourth passageways and the remainder of the valve spool chamber, and said first and second housing parts are connected together.

4. The air control system of claim 3, wherein the first housing part includes a cylindrical chamber and the second housing part includes a cylindrical nipple and the cylindrical nipple of the second housing part fits within the cylindrical chamber of the first housing part, and there is a seal ring between the nipple and a sidewall of the chamber in which the nipple is received.

5. The control system of claim 4, wherein the first solenoid valve has a first housing, the second solenoid valve has a second housing, the first and second housings are adjacent each other, the first part of the latching valve housing is connected to the first solenoid valve housing and the second part of the latching valve housing is connected to the second solenoid valve housing.

6. The air control system of claim 4, wherein the cylindrical chamber has a sidewall including an axial groove and the cylindrical nipple has a sidewall including a lock lug sized to fit into the axial groove, and said lock lug and groove form a bayonet connection.

7. The air control system of claim 6, wherein the first housing part includes a lock lug receiving opening positioned in its sidewall circumferentially from the axial slot, and said second housing part is rotatable in position when the cylindrical nipple is within the cylindrical chamber, for moving the lock lug from the axial slot into the lock lug receiving opening.

8. The air control system of claim 7, wherein the first and second housing parts are sufficiently resilient that the second housing part can be rotated relative to the first housing part for moving the lock lug back and forth between the axial slot and the lock lug receiving opening.

9. The air control system of claim 4, wherein the seal ring between the nipple and the sidewall of the cylindrical chamber is positioned in the cylindrical chamber axially inwardly of the lock lug receiving opening in the sidewall of the cylindrical chamber.

10. The air control system of claim 3, wherein the first and second housing parts are each molded from a structural plastic.

11. The air control system of claim 10, wherein the first housing part includes a cylindrical chamber and the second housing part includes a cylindrical nipple and the cylindrical nipple of the second housing part fits within the cylindrical chamber of the first housing part, and there is a seal ring between the nipple and a sidewall of the chamber in which the nipple is received.

12. The control system of claim 11, wherein the first solenoid valve has a first housing, the second solenoid valve has a second housing, the first and second housings are adjacent each other, the first part of the latching valve housing is connected to the first solenoid valve housing and the second part of the latching valve housing is connected to the second solenoid valve housing.

13. The air control system of claim 11, wherein the cylindrical chamber has a sidewall including an axial groove and the cylindrical nipple has a sidewall including a lock lug sized to fit into the axial groove, and said lock lug and groove form a bayonet connection.

14. The air control system of claim 13, wherein the first housing part includes a lock lug receiving opening positioned in its sidewall circumferentially from the axial slot, and said second housing part is rotatable in position when the cylindrical nipple is within the cylindrical chamber, for moving the lock lug from the axial slot into the lock lug receiving opening.

15. The air control system of claim 14, wherein the first and second housing parts are sufficiently resilient that the second housing part can be rotated relative to the first housing part for moving the lock lug back and forth between the axial slot and the lock lug receiving opening.

16. The air control system of claim 11, wherein the seal ring between the nipple and the sidewall of the cylindrical chamber is positioned in the cylindrical chamber axially inwardly of the lock lug receiving opening in the sidewall of the cylindrical chamber.

* * * * *